US012148273B2

(12) United States Patent
Grant et al.

(10) Patent No.: US 12,148,273 B2
(45) Date of Patent: *Nov. 19, 2024

(54) SYSTEMS AND METHODS FOR PROTECTING RETAIL DISPLAY MERCHANDISE FROM THEFT

(71) Applicant: InVue Security Products Inc., Charlotte, NC (US)

(72) Inventors: Jeffrey A. Grant, Charlotte, NC (US); Michael R. Johnston, Waxhaw, NC (US); Jonathon D. Phillips, Fort Mill, SC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,610

(22) Filed: Jan. 26, 2023

(65) Prior Publication Data

US 2023/0169835 A1 Jun. 1, 2023

Related U.S. Application Data

(63) Continuation of application No. 17/175,013, filed on Feb. 12, 2021, now Pat. No. 11,568,721, which is a (Continued)

(51) Int. Cl.
*G08B 13/14* (2006.01)
*A47F 3/00* (2006.01)

(Continued)

(52) U.S. Cl.
CPC .......... *G08B 13/1427* (2013.01); *A47F 3/002* (2013.01); *A47F 7/024* (2013.01);

(Continued)

(58) Field of Classification Search
CPC ................ G08B 13/1427; G08B 13/14; G08B 21/0225; G08B 21/0233; G08B 21/0266;

(Continued)

(56) References Cited

U.S. PATENT DOCUMENTS 4,293,852 A 10/1981 Rogers
5,051,725 A 9/1991 Caccitolo (Continued)

FOREIGN PATENT DOCUMENTS

CN 201750762 U 2/2011
WO 2011094676 A1 8/2011

OTHER PUBLICATIONS

Ligong Li, First Chinese Office Action for Chinese Patent Application No. 2012800243360, dated Mar. 2, 2015, 10 pages, Chinese Patent Office, Beijing, China.

(Continued)

*Primary Examiner* — An T Nguyen

(74) *Attorney, Agent, or Firm* — InVue Security Products Inc.

(57) ABSTRACT

Security systems and methods configured for use with an item of merchandise for retail display include a housing, at least one sensor carried by the housing and at least one output device carried by the housing. The security system further includes a controller carried by the housing and operably coupled to the sensor and to the output device. The controller is operable to determine a distance traveled by the item of merchandise from a retail display "home" position based upon a sensor input from the sensor, and to activate the output device based upon the distance traveled by the item of merchandise exceeding a threshold distance. The controller may utilize the at least one sensor in conjunction with an inertial navigation system (INS) and motion processing algorithms or techniques to determine the distance (Continued)

traveled by the item of merchandise from the retail display "home" position.

22 Claims, 8 Drawing Sheets

Related U.S. Application Data continuation of application No. 16/598,726, filed on Oct. 10, 2019, now abandoned, which is a continuation of application No. 16/002,549, filed on Jun. 7, 2018, now Pat. No. 10,475,307, which is a continuation of application No. 15/896,470, filed on Feb. 14, 2018, now Pat. No. 10,002,505, which is a continuation of application No. 15/637,347, filed on Jun. 29, 2017, now Pat. No. 9,928,703, which is a continuation of application No. 15/372,058, filed on Dec. 7, 2016, now Pat. No. 9,728,054, which is a continuation of application No. 14/494,049, filed on Sep. 23, 2014, now Pat. No. 9,552,708, which is a continuation of application No. 13/474,862, filed on May 18, 2012, now Pat. No. 8,878,673.

(60) Provisional application No. 61/487,827, filed on May 19, 2011.

(51) Int. Cl.
*A47F 7/024* (2006.01)
*G08B 21/02* (2006.01)
*G08B 21/18* (2006.01)

(52) U.S. Cl.
CPC ......... *G08B 13/14* (2013.01); *G08B 21/0225* (2013.01); *G08B 21/0233* (2013.01); *G08B 21/0266* (2013.01); *G08B 21/0272* (2013.01); *G08B 21/0277* (2013.01); *G08B 21/0286* (2013.01); *G08B 21/182* (2013.01)

(58) Field of Classification Search
CPC ........... G08B 21/0272; G08B 21/0277; G08B 21/0286; G08B 21/182; A47F 3/002; A47F 7/024
See application file for complete search history.

(56) References Cited

U.S. PATENT DOCUMENTS 5,151,684 A 9/1992 Johnsen
5,757,271 A 5/1998 Andrews
6,072,393 A 6/2000 Todd
6,133,830 A 10/2000 D'Angelo et al.
6,271,756 B1 8/2001 Davies, Jr. et al.
6,992,585 B2 1/2006 Saleh et al.
7,009,512 B2 3/2006 Cordoba
7,190,264 B2 3/2007 Brown et al.
7,218,226 B2 5/2007 Wehrenberg
7,375,638 B2 5/2008 Light et al.
7,667,601 B2 2/2010 Rabinowitz et al.
7,696,857 B2 4/2010 Kritt et al.
7,881,988 B2 2/2011 Otani et al.
8,002,181 B2 8/2011 Ulrich et al.
8,018,334 B1 * 9/2011 DiMartino ......... G08B 21/0294 340/505
8,115,623 B1 2/2012 Green
8,212,672 B2 7/2012 Brenner
8,239,277 B2 8/2012 Lee et al.
8,810,392 B1 * 8/2014 Teller .................... G08B 21/24 340/572.1
8,878,673 B2 11/2014 Grant et al.
9,171,439 B2 * 10/2015 Yeager ............... G08B 13/2402
9,552,708 B2 1/2017 Grant et al.
9,728,054 B2 8/2017 Grant et al.
9,928,703 B2 3/2018 Grant et al.
10,002,505 B1 6/2018 Grant et al.
10,475,307 B2 11/2019 Grant et al.
11,568,721 B2 1/2023 Grant et al.
2003/0206106 A1 11/2003 Deconinck et al.
2004/0124981 A1 7/2004 Moldavsky et al.
2004/0145471 A1 7/2004 Lawrenson et al.
2004/0155777 A1 8/2004 Mitchell et al.
2005/0040229 A1 2/2005 Andrews
2007/0035380 A1 2/2007 Overhultz et al.
2007/0035391 A1 2/2007 Hamzy
2007/0112907 A1 5/2007 Defosse
2007/0146133 A1 6/2007 Wehrenberg
2007/0229259 A1 * 10/2007 Irmscher ............ G06Q 30/0242 340/568.2
2008/0060241 A1 3/2008 Molinaro
2008/0079567 A1 4/2008 Poor
2008/0204239 A1 8/2008 Marszalek et al.
2009/0033492 A1 2/2009 Rapp et al.
2009/0079566 A1 3/2009 Goldstein et al.
2009/0135013 A1 5/2009 Kushida et al.
2009/0174544 A1 7/2009 Allen et al.
2010/0038330 A1 2/2010 Zu
2010/0188222 A1 * 7/2010 Irmscher ............ G08B 21/0272 340/568.2
2011/0062294 A1 * 3/2011 Johnson ................. F16M 11/00 248/161
2011/0068906 A1 3/2011 Shafer et al.
2011/0068921 A1 3/2011 Shafer
2011/0072132 A1 3/2011 Shafer et al.
2011/0074582 A1 3/2011 Alexis
2011/0215060 A1 * 9/2011 Niederhuefner ........ A47F 1/125 211/59.3
2011/0241870 A1 * 10/2011 Irmscher ............ G08B 21/0225 340/568.2
2011/0254661 A1 10/2011 Fawcett et al.
2011/0288938 A1 * 11/2011 Cook ................. G08B 13/1427 705/14.66
2012/0126981 A1 5/2012 Bawamia et al.
2012/0280810 A1 11/2012 Wheeler
2012/0293330 A1 11/2012 Grant et al.
2013/0063266 A1 3/2013 Yunker et al.
2013/0257616 A1 10/2013 Taylor et al.
2013/0268316 A1 * 10/2013 Moock .............. G06Q 30/0201 705/7.29
2014/0240088 A1 8/2014 Robinette et al.
2015/0009034 A1 1/2015 Grant et al.
2017/0301198 A1 10/2017 Grant et al.
2018/0293856 A1 10/2018 Grant et al.
2020/0051410 A1 2/2020 Grant et al.

OTHER PUBLICATIONS

Ligong Li, Second Office Action for Chinese Patent Application No. 2012800243360, dated Nov. 8, 2015, pp. 1-6, Chinese Patent Office.
Alexandra Voyé-Piccoli, "The International Search Report and The Written Opinion of the International Searching Authority, or the Declaration for International Application No. PCT/US2012/038764 filed on May 21, 2012", dated Oct. 31, 2012, 20 pages, European Patent Office, Rijswijk, Netherlands.
Simin Baharlou, International Preliminary Report on Patentability for International Patent Application No. PCT/US2012/038764, dated Nov. 19, 2013, pp. 1-9, The International Bureau of WIPO, Geneva, Switzerland.
Examination Report from corresponding European Patent Application No. 12726957.0 dated Apr. 10, 2017 (5 pages).

* cited by examiner

SYSTEMS AND METHODS FOR PROTECTING RETAIL DISPLAY MERCHANDISE FROM THEFT

CROSS REFERENCE TO RELATED APPLICATIONS

This application is a continuation of U.S. patent application Ser. No. 17/175,013, filed Feb. 12, 2021, which is a continuation of U.S. patent application Ser. No. 16/598,726, filed Oct. 10, 2019, which is a continuation of U.S. patent application Ser. No. 16/002,549, filed Jun. 7, 2018, and now U.S. Pat. No. 10,475,307, which is a continuation of U.S. patent application Ser. No. 15/896,470, filed Feb. 14, 2018, and now U.S. Pat. No. 10,002,505, which is a continuation of U.S. patent application Ser. No. 15/637,347, filed Jun. 29, 2017, and now U.S. Pat. No. 9,928,703, which is a continuation of U.S. patent application Ser. No. 15/372,058, filed Dec. 7, 2016, and now U.S. Pat. No. 9,728,054, which is a continuation of U.S. application Ser. No. 14/494,049, filed Sep. 23, 2014 and now U.S. Pat. No. 9,552,708, which is a continuation of U.S. application Ser. No. 13/474,862, filed May 18, 2012 and now U.S. Pat. No. 8,878,673, which claims the benefit of U.S. Provisional Application No. 61/487,827, filed May 19, 2011, the entire disclosures of which are incorporated herein by reference.

FIELD OF THE INVENTION

The present invention relates to merchandise security, and, more particularly, to systems and methods for protecting retail display merchandise from theft.

BACKGROUND OF THE INVENTION

Displays for retail merchandise utilize different types of theft deterrent security systems and methods to discourage shoplifters. Many of these systems and methods include sensors and alarms that are mechanically attached, or are mechanically attached and electrically connected, to the item of merchandise to be protected. When the integrity of the display is compromised, such as by cutting or removing (i.e., unplugging) a cable that extends between the security system and the item of merchandise, or by separating (i.e., detaching) the item of merchandise from the security system, an alarm is activated to alert store personnel of a potential theft situation. Other security systems in the form of electronic article surveillance (EAS) tags activate an alarm in the event that an item of merchandise is passed through a security gate without the EAS tag being deactivated or removed (i.e., detached) from the merchandise. Thus, conventional security systems having mechanical or electro-mechanical cables tethered to an item of merchandise, and other security systems that are physically attached to an item of merchandise, such as EAS tags, provide visual security at the expense of restricting a potential purchaser's ability to interact freely with the merchandise. Consequently, conventional tethered and EAS tag security systems suffer from the disadvantage of providing a reduced "customer experience" for a potential purchaser of the merchandise.

The above-described tethered and EAS tag security systems typically utilize some type of key, for example a mechanical, magnetic, electrical, optical (e.g. Infrared) or acoustical (e.g. radio frequency) key, to detach the protected item of merchandise from the security system and/or to arm and disarm the alarm of the security system. A significant disadvantage of such security systems is that the key may become lost, or worse, may be stolen and used at the same retail store or at another retail store that utilizes the same type of security system to enable an unauthorized person to disarm the alarm and/or detach the item of merchandise from the security system. It is becoming increasingly more difficult to prevent the theft of the keys for these security systems by thieves, as well as by dishonest employees of the retail store, due to the number of keys that need to be available for use by store personnel to operate the different types of security systems required to protect the numerous items of merchandise on display in larger (e.g., "big box") retail stores.

Wireless security systems that activate an alarm when the item of merchandise is removed from the display area, including EAS tag security systems, address some of the shortcomings of conventional tethered security systems. However, current wireless security systems are inherently unreliable because they rely on external references for determining the position of the item of merchandise relative to a "home" position, or relative to a "safe" zone, boundary or area. For example, many wireless security systems rely on a global positioning system (GPS) signal or other radio frequency (RF) signal received from a source external to the security system. As a result, continuous communication between the external signal sources, for example a base station and the wireless security device cannot be guaranteed. Loss of communication with the base station creates a bias toward an alarm condition, and thus, an increased occurrence of false alarms. False alarms require additional attention to the security system from store personnel that results in decreased customer interaction with the merchandise, and consequently, a reduced customer experience for the potential purchaser of the merchandise.

Thus, the need exists for a security system that is not mechanically or electro-mechanically tethered to an item of merchandise, yet can be configured for protecting various retail display items of merchandise from theft. There is a further need for a security system for protecting an item of merchandise from theft that does not require a vulnerable key to arm/disarm the security system or to attach/detach the item of merchandise from the security system. There exists a still further need for a security system for protecting an item of merchandise from theft that does not rely on external references to determine the position of the item of merchandise relative to a "home" position or relative to a "safe" zone, boundary or area.

SUMMARY OF THE INVENTION

In view of the foregoing, it is therefore an object of the present invention to provide improved security systems and methods for protecting retail display items of merchandise from theft that overcome the aforementioned disadvantages of conventional security systems and methods for protecting merchandise.

The above and other objects, features, and advantages are provided by a security system and method in accordance with the present invention configured for protecting an item of merchandise in a retail store on display to be evaluated and operated by a customer considering whether to purchase the merchandise. The security system may include a portable housing, at least one sensor carried by the housing, and at least one output device also carried by the housing. The security system may also include a controller carried by the housing that is operably coupled to the at least one sensor and to the at least one output device. The controller may, for example, be operable to process motion of the item of merchandise based upon output from the at least one sensor. In a particular example, the controller may process motion of the item of merchandise to thereby determine a distance traveled from a "home" position within the retail display and to activate the at least one output device in the event that the distance traveled from the "home" position exceeds at least one threshold distance.

In particular examples, the at least one sensor may include one or more of an accelerometer, a digital compass and a gyroscope.

In particular examples, the at least one output device may include one or more of an audio output device, a haptic output device, a visual output device and wireless communications circuitry carried by the housing for producing a wireless signal output.

In particular examples, the at least one threshold distance may include first and second threshold distances. Accordingly, the controller may be operable to activate the at least one output device with a first indication based upon the distance traveled by the item of merchandise from the "home" position exceeding the first threshold distance, and subsequently activate the at least one output device with a second indication based upon the distance traveled by the item of merchandise from the "home" position exceeding the second threshold distance. The controller may also be operable to deactivate the at least one output device based upon the item of merchandise returning to a distance from the "home" position that is within at least one of the first and second threshold distances.

The security system may further include at least one input device and the controller may be operable to deactivate the at least one output device based upon a signal from the at least one input device. The security system may further include at least one satellite positioning signal receiver carried by the housing and operable to determine a geographical position that may be reported to a monitoring station, for example.

In a particular example, the security system is configured for operation with an item of electronic merchandise, for example a cellular telephone (commonly referred to as a "cell phone") that includes at least one sensor, at least one output device and a controller. In this manner, the security system can take the form of a software application that utilizes the at least one sensor, the at least one output device and the controller provided by the item of electronic merchandise and configures the controller to perform the various security functions described herein.

In another embodiment, the security system is embodied by a display battery pack that is utilized to temporarily replace the service battery pack of an item of electronic merchandise in a retail store on display to be evaluated and operated by a potential purchaser considering whether to purchase the merchandise. The display battery pack may include a housing configured to couple to the electronic item of merchandise for housing one or more components of the security system along with at least one battery cell operable to supply power to the electronic item of merchandise. The components of the security system housed by the display battery pack may include at least one sensor carried by the housing, and at least one output device carried by the housing. The display battery pack may further include a controller carried by the housing and coupled to the at least one sensor and to the at least one output device. As previously described, the controller may be operable to process motion of the electronic item of merchandise and thereby determine a distance traveled by the electronic item of merchandise from a retail display "home" position based upon the at least one sensor, and to activate the at least output device based upon the distance of the item of merchandise from the retail display "home" position exceeding at least one threshold distance.

In yet another embodiment, the security system is embodied by an externally mounted security module operable for being coupled to an item of merchandise in a retail store on display to be evaluated and operated by a customer considering whether to purchase the merchandise. The security module may include a housing, at least one sensor carried by the housing, at least one output device carried by the housing, and a controller carried by the housing and coupled to the at least one sensor and to the at least one output device. As previously described, the controller may be operable to process motion of the item of merchandise based upon the at least one sensor and thereby determine a distance traveled by the item of merchandise from a retail display "home" position. The controller may also be operable to activate the at least one output device based upon the distance of the item of merchandise from the "home" position exceeding at least one threshold distance. The security system may also include an attachment element operable to couple the housing of the security module to the item of merchandise.

A method according to the invention is directed to protecting an item of merchandise in a retail store on display to be evaluated and operated by a customer considering whether to purchase the merchandise. The method may include providing a portable housing, at least one sensor carried by the housing, at least one output device carried by the housing, and a controller carried by the housing and coupled to the at least one sensor and to the at least one output device. The method may further include using the at least one sensor and the controller to process motion of the item of merchandise and thereby determine a distance traveled by the item of merchandise from a retail display "home" position. The method may further include activating the at least one output device in the event that the distance traveled by the item of merchandise from the retail display "home" position exceeds at least one threshold distance.

A computer-readable medium according to the invention is directed to a non-transitory computer-readable medium for use with an item of merchandise in a retail store on display to be evaluated and operated by a customer considering whether to purchase the merchandise. A security system associated with the computer-readable medium may include a portable housing, at least one sensor carried by the housing, at least one output device carried by the housing, and a controller carried by the housing and coupled to the at least one sensor and to the at least one output device. The non-transitory computer-readable medium may have computer-executable instructions for causing the security system to process motion of the item of merchandise and thereby determine a distance traveled by the item of merchandise from a retail display "home" position using the controller and the at least one sensor. The non-transitory computer-readable medium may have computer-executable instructions for causing the security system to activate the at least one output device in the event that the distance traveled by the item of merchandise from the retail display "home" position exceeds at least one threshold distance.

DETAILED DESCRIPTION OF THE PREFERRED EMBODIMENTS

The present invention will now be described more fully hereinafter with reference to the accompanying drawings, in which exemplary and preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and multiple prime notations are used to indicate similar elements in alternative embodiments.

Figure 1:
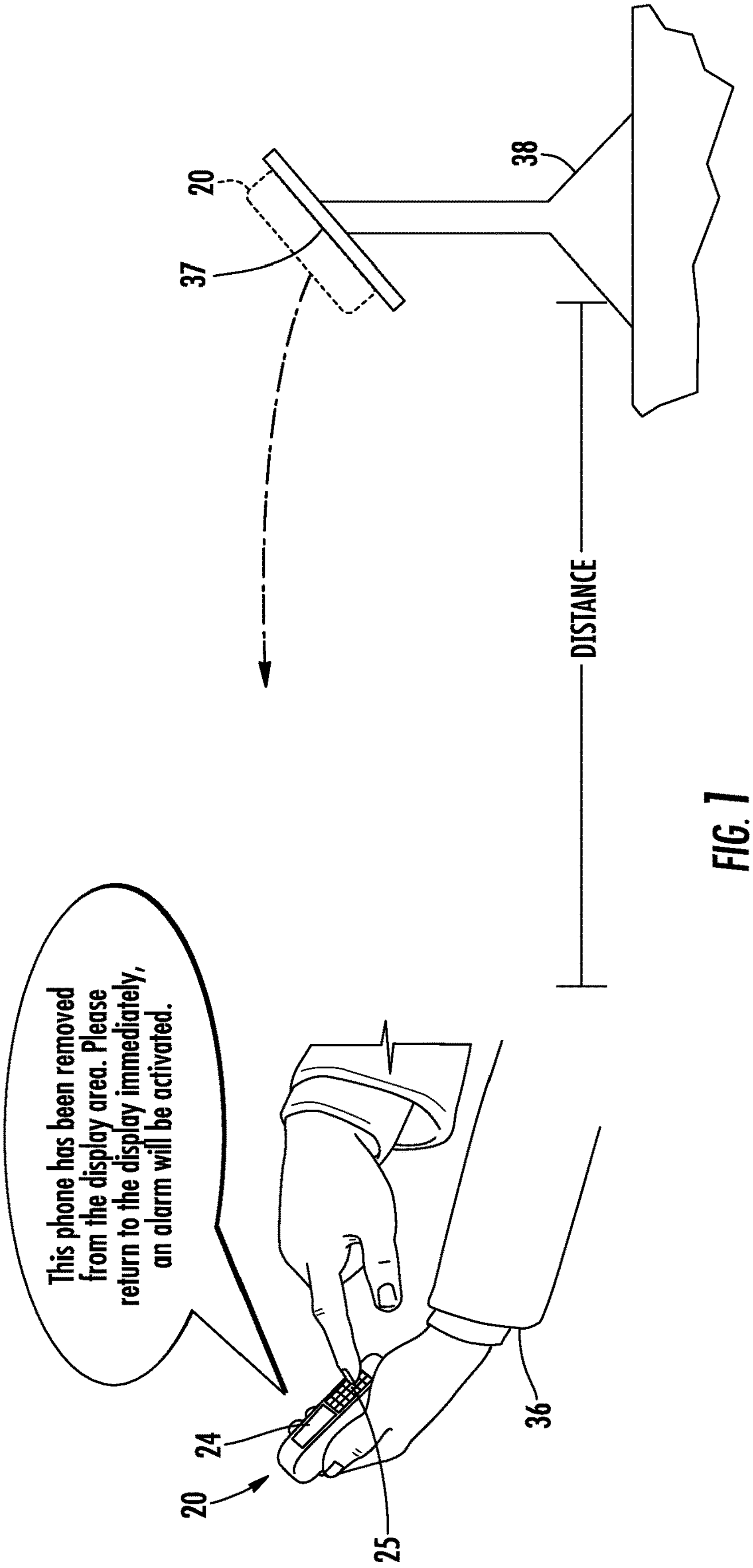
FIG. 1 is a schematic view depicting an exemplary embodiment of a security system in accordance with the present invention for protecting retail display merchandise from theft.
Figure 2:
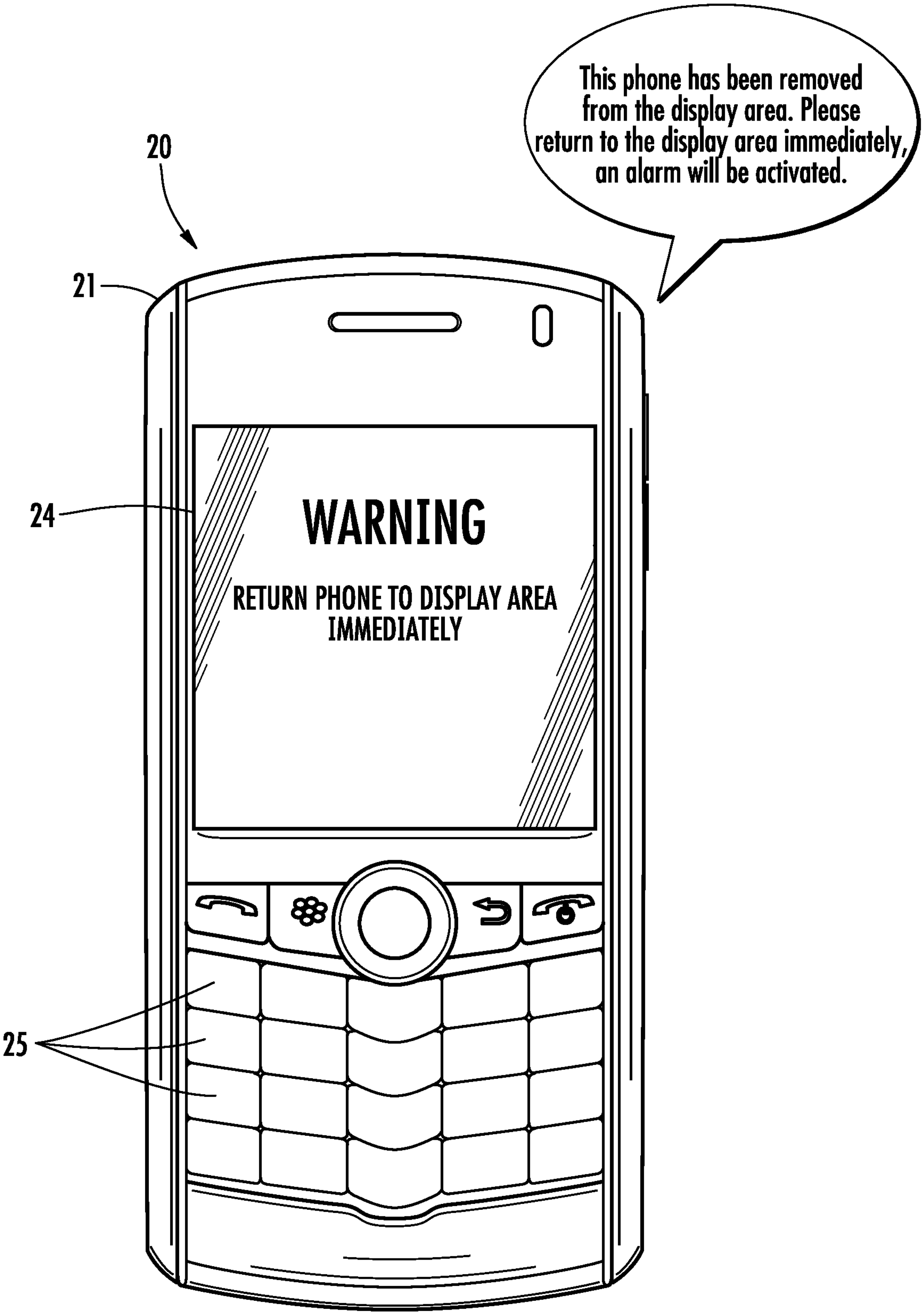
FIG. 2 is an enlarged plan view of an item of electronic merchandise configured for operation with the security system of FIG. 1.
Figure 3:
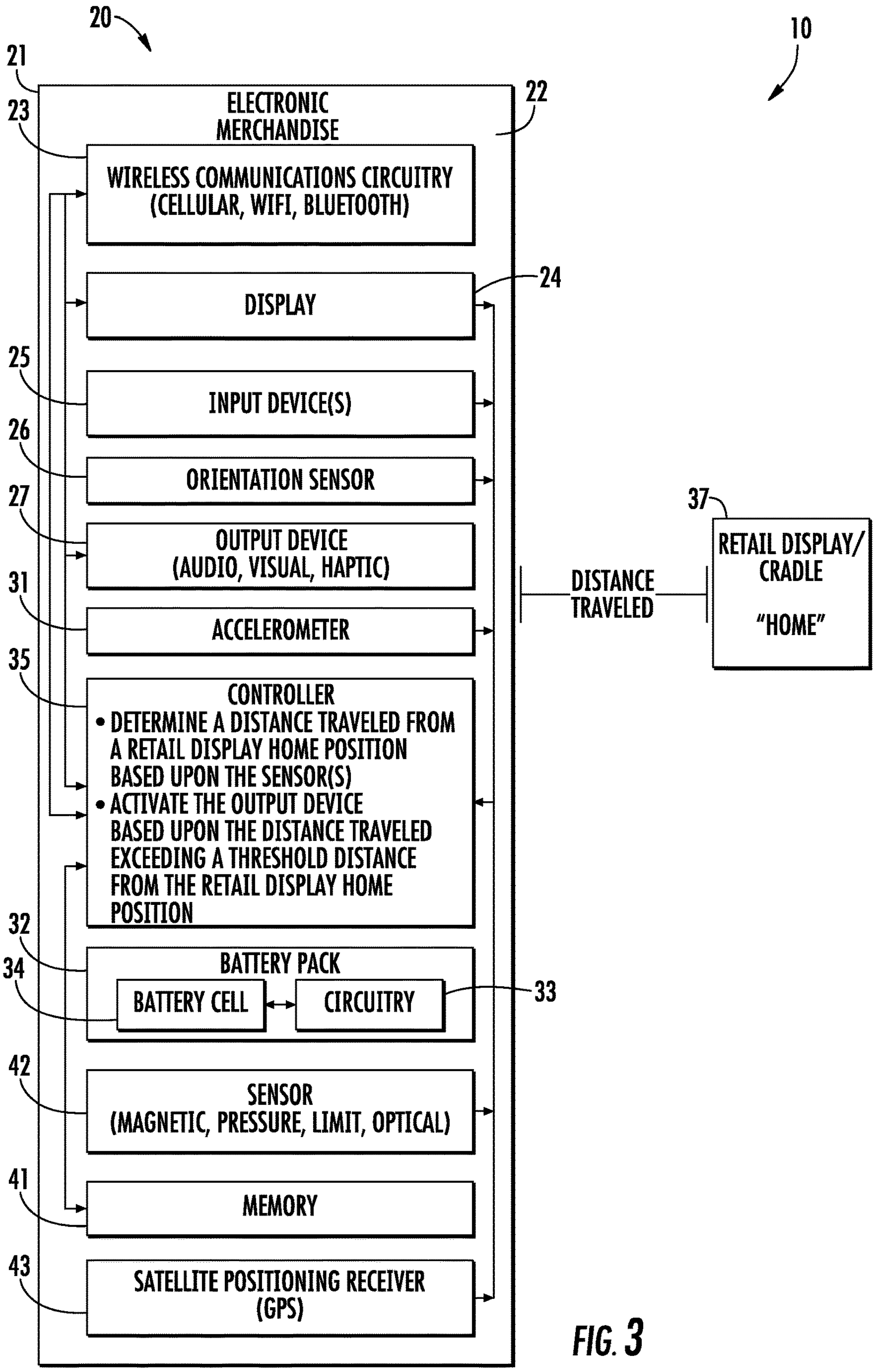
FIG. 3 is a flowchart illustrating an exemplary embodiment of a system and method in accordance with the present invention for operating the security system of FIG. 1 with the item of electronic merchandise of FIG. 2.

Referring initially to FIGS. 1-3, in one embodiment a retail display security system 10 according to the invention is configured for operation with an item of electronic merchandise 20, which is illustratively shown herein as a mobile wireless communications device, and more specifically, a cellular telephone. The item of electronic merchandise 20 includes a portable (i.e. movable) housing 21 and a substrate 22, for example, a printed circuit board (PCB) comprising wireless communications circuitry that is carried by the housing. The substrate 22 may be a rigid PCB, or alternatively, may be a flexible substrate or flexible PCB. In some embodiments, the PCB may be replaced by or used in conjunction with a metal chassis or other structural substrate, as will be appreciated by those skilled in the art.

The wireless communications circuitry 23 carried by the housing 21 may include, for example, one or more wireless transceivers for transmitting and receiving cellular, WiFi, and/or Bluetooth communications. The item of electronic merchandise 20 also illustratively includes a satellite positioning signal receiver 43, for example, a Global Positioning System (GPS) satellite receiver, as is known in the art. The item of electronic merchandise 20 further includes a display 24, and a plurality of input devices 25, illustratively keys, for accepting user inputs, as will also be appreciated by those skilled in the art. Input devices 25 may also be buttons or the like, or may be embodied by a touch screen, as is known in the art.

The item of electronic merchandise 20 also includes an orientation sensor 26 carried by the housing 21. The orientation sensor 26 may be a gyroscope, for example, and more particularly, may be a 3-axis gyroscope. The orientation sensor 26 may also be embodied by a digital compass, for example, as will be appreciated by those skilled in the art.

The item of electronic merchandise 20 also includes an output device 27. In particular embodiments, the output device 27 is an audio output transducer, or speaker. The output device 27 may be another type of audio output device and other output devices may also be used, for example, a haptic output device or a visual output device, alone or in combination with an audio output device.

In the illustrated embodiments, the item of electronic merchandise 20 also includes an accelerometer 31 carried by the housing 21. The accelerometer 31 may be a multi-axis accelerometer, or alternatively, the item of electronic merchandise 20 may include multiple directional accelerometers.

The item of electronic merchandise 20 also includes a battery pack 32 that is likewise carried by the housing 21. The battery pack 32 includes battery management circuitry 33, such as power management circuitry, and one or more battery cells 34 operably coupled to the power management circuitry. The battery cells 34 may be rechargeable battery cells, such as a nickel-metal hydride or lithium ion battery cells. In some embodiments, the battery cells 34 may be replaced by or used in conjunction with another power source, such as a fuel cell, as will be appreciated by those skilled in the art. When not operating in conjunction with the retail display security system 10 of the present invention, the item of electronic merchandise 20 may be powered by an external power source through a conventional power cord or charger.

The item of electronic merchandise 20 also includes a controller 35 carried by the housing 21 and operably coupled to the wireless communications circuitry 23, the accelerometer 31, the orientation sensor 26, and the output device 27. The controller 35 advantageously cooperates with the wireless communications circuitry 23 to coordinate and control operations of the item of electronic merchandise 20, namely wireless communications functions and capabilities of the cellular telephone. Operations may include mobile voice and data operations, including email and Internet data, for example.

The controller 35 cooperates with the orientation sensor 26 to determine a reference direction of the item of electronic merchandise 20. For example, when the electronic merchandise 20 is held by a potential purchaser 36 in an operational position with the display 24 and input devices 25 facing the customer, the orientation sensor 26 may cooperate with the controller 35 to determine the direction that the customer and the electronic merchandise are facing, for example, North (FIG. 1). The controller 35 also cooperates with the accelerometer 31 to measure and monitor an acceleration of the item of electronic merchandise 20.

Based upon the orientation and measured accelerations of the item of electronic merchandise 20, as well as the elapsed time of any movements of the electronic merchandise, the controller 35 determines a distance from a given location, such as a designated retail display "home" position. The "home" position may, for example, be established by the item of electronic merchandise 20 being in contact with or in close proximity to a holder, platform or the like, generically referred to herein as a cradle 37. Cradle 37 may stand alone, or alternatively, may be permanently attached to, removably attached to, or otherwise operably coupled with a display stand, alarm module, base or the like 38. More particularly, the controller 35 may be programmed directly, for example, via the input devices 25, or alternatively, may be programmed indirectly by an external system or device, so that the location of the cradle 37 is the "home" position of the item of electronic merchandise 20. The controller 35 advantageously determines the distance the item of electronic merchandise 20 is moved from the "home" position (e.g. cradle 37), when the item of merchandise is removed from the "home" position by a customer considering whether to purchase the merchandise. As used herein, the term "distance traveled" refers to the absolute value of the radial distance that the item of electronic merchandise 20 is moved away from the "home" position. In particular examples, the controller 35 utilizes conventional motion processing algorithms to determine the distance traveled by the item of electronic merchandise 20 away from the "home" position.

It should be noted that the "home" position need not be the same location each time. Additionally, or alternatively, there may be more than one "home" position. For example a "home" position may be a battery charging station or any number of a plurality of "power hotspots," such as inductive power transfer charging stations. Alternatively, or additionally, the "home" position may be a location at which the item of electronic merchandise 20 remains motionless for a period of time and the wireless communications circuitry 23 indicates a minimum threshold power signal. In other words, a "home" position may be established when the item of electronic merchandise is motionless and charging for a predetermined period of time. Alternatively, or in conjunction with establishing one or more "home" positions, the controller 35 may use one or more motion sensors and motion processing algorithms to establish (i.e. map) a "safe" zone (also boundary, perimeter or area) with or without reference to one or more "home" positions. The controller can then determine, based on subsequent motion processing, whether an item of merchandise is moved from a location within the "safe" zone to a location outside or beyond the established "safe" zone.

In particular embodiments, the controller 35 determines the distance traveled from the "home" position based upon inertial navigation system (INS) techniques, for example, dead reckoning, as will be appreciated by those skilled in the art. As such, no external references, for example, a GPS determined position or RF communication, are required to determine the distance traveled by the item of electronic merchandise 20 from the "home" position. As a result, the security system 10 configured for operation with an item of electronic merchandise 20 in accordance with this embodiment of the invention is particularly advantageous for use in an indoor environment, for example, a display area of a retail store, where a GPS position cannot always be determined and where RF communications can be obstructed.

The item of electronic merchandise 20 illustratively includes a memory 41 for storing computer-executable instructions and data for processing. The controller 35 may cooperate with the computer-executable instructions in the memory 41, for example, an algorithm embodied in a software application, to perform the functions described herein. As will be appreciated by those skilled in the art, the controller 35 may be embodied as a hardware component or as a combination of hardware and application software.

Based upon the distance traveled by the item of electronic merchandise 20 from the cradle 37, the controller 35 determines whether the distance traveled exceeds at least one threshold distance. For example, the controller 35 may determine whether the item of electronic merchandise 20 has been moved more than ten feet in any radial direction from the cradle 37. Of course, the threshold distance may be set to any desired distance, or alternatively, to another variable, such as time, acceleration, orientation, etc. In particular, the threshold variable may be set to any desired value of any suitable variable via programming using the input devices 25, or wirelessly via the wireless communications circuitry 23. Alternatively, the memory 41 of the item of merchandise 20 may be pre-programmed with one or more predetermined threshold variables and/or values.

Regardless, when the threshold distance has been exceeded the controller 35 activates the output device 27 with a visual, an audible or haptic alarm. For example, the alarm may be an audible voice message requesting that the item of electronic merchandise 20 be returned to the cradle 37 within a limited period of time. The voice message may be customizable in that it may be set to be a male or female voice, and/or may be set to speak in a predetermined language or to speak in one or more of multiple languages. The controller 35 alternatively or additionally may activate other output devices 27, for example, a haptic (e.g. vibration) device or a visual (e.g. flashing LED) device.

In particular embodiments, there may be more than one threshold, for example a first threshold and a second threshold. When the controller 35 determines that a first threshold distance has been exceeded, the controller may activate an initial "warning" via the output device 27. The warning may be a voice, as noted above, and may indicate for example that unless the item of electronic merchandise 20 is returned to the "home" position or is brought back within the first threshold distance, an alarm will be activated.

If the item of electronic merchandise 20 is not timely returned to the "home" location or to a location within the first threshold distance, and instead, the second threshold distance is exceeded, the controller 35 may activate a subsequent alarm, such as an audible siren, via the output device 27. As previously mentioned, a time-based threshold may also be used alone or in combination with one or more distance-based thresholds. If the controller 35 activates an alarm indication, the controller may advantageously cooperate with the wireless communications circuitry 23 to transmit the location of the item of electronic merchandise 20 to another component of the security system or device. For example, if the item of electronic merchandise 20 is removed from the display area of the retail store to a location where GPS reception is possible, the controller 35 may transmit GPS coordinates via the wireless communication circuitry 23 to a remote server or central monitoring station based upon the satellite positioning signal receiver 43. The controller 35 may also cooperate with the wireless communications circuitry 23 to call a telephone number and/or send an email or text message to security or "loss prevention" personnel. In particular embodiments, if the item of electronic merchandise 20 includes a camera or camcorder, the controller 35 may activate the camera to take still photographs and/or activate the camcorder to record video footage. Regardless, the controller 35 may then further cooperate with the wireless communications circuitry 23 to transmit the video data to security or "loss prevention" personnel to be used to identify an alleged shoplifter.

Still further, the controller 35 may cooperate with the wireless communications circuitry 23 to wirelessly transmit instructions to activate another output device 27, such as a store alarm remote from the item of electronic merchandise 20 and the display area. As will be appreciated by those skilled in the art, the controller 35 may cooperate with the wireless communications circuitry 23 to likewise communicate instructions to other security systems and/or devices to perform additional operations. In one advantageous example, the controller 35 may cooperate with the wireless communications circuitry 23 to instruct adjacent cradles 37 supporting other items of merchandise to enter a "lockdown mode" so that the other items of merchandise supported thereon cannot be removed and stolen. Lockdown may be achieved by mechanical, magnetic, electrical, electromechanical or electromagnetic locks, as will be understood by those skilled in the art.

Moreover, in some embodiments, the controller 35 may determine whether the location of the item of electronic merchandise 20 is within a given geographical area based upon the distance traveled as determined by the movements of the merchandise. The controller 35 may cooperate with the wireless communications circuitry 23 to wirelessly transmit instructions to perform a further function based upon this distance. For example, the controller 35 may cooperate with the wireless communications circuitry 23 to send instructions to activate a remote audio and/or video presentation terminal when the user is adjacent the remote terminal. The remote terminal may provide sales or technical product information to the user related to the item of electronic merchandise 20, for example. The controller 35 may cooperate with the wireless communications circuitry 23 to transmit other instructions based upon a position, location, orientation or distance from a reference location of the merchandise 20, as will be appreciated by those skilled in the art.

The controller 35 may deactivate the output device 27 upon the item of electronic merchandise 20 being returned (i.e. moved back) within the first or second threshold distance, for example. Alternatively or additionally, the controller 35 may disable the output device 27 based upon an input from the input devices 25, for example, a security code entered via a keypad. The controller 35 may also deactivate the output device 27 wirelessly via the wireless communications circuitry 23, or via a key, such as a mechanical, magnetic, electrical, optical or infrared key fob device. Of course, the controller 35 may perform additional and/or other communications functions upon an alarm condition, as will be appreciated by those skilled in the art, including for example, disabling one or more functions, capabilities or operations of the merchandise 20.

A further sensor 42 may be carried by the housing 21 adjacent the battery packs 32 and coupled to the controller 35. The controller 35, based upon an unauthorized entry into the housing 21, such as an attempted access to the battery pack 32 through the battery door, may activate an alarm from the output device 27. The further sensor 42 may be any type of sensor, for example, a magnetic sensor, an optical sensor, a pressure or limit switch, or a contact switch. Activation of the alarm may advantageously indicate an unauthorized attempt to remove the battery pack 32 in an effort to disable the security system 10, and thereby provide an increased time for a response from security personnel. The controller 35 may perform other actions, for example, communications via the wireless communications circuitry 23 as previously described, based upon input from the further sensor 42.

The security system 10 configured for operation with the item of electronic merchandise 20 may advantageously be calibrated when it is placed on the cradle 37 at the "home" position in the display area. More particularly, the controller 35 of the item of electronic merchandise 20 may receive a wireless signal or other signal from the cradle 37 indicating that the location of the cradle is the desired "home" position. Since position errors may accumulate each time the item of electronic merchandise 20 is moved, the security system 10 and/or the cradle 37 may be equipped with a suitable sensor and associated circuitry to reset the "home" position when the item of electronic merchandise 20 is supported on the cradle. In a particular embodiment, the cradle 37 is a charging station and the controller 35 resets the "home" position of the item of electronic merchandise 20 based upon the merchandise being in a motionless state for a predetermined period of time and/or being charged by the charging station. Alternatively, or in addition, other continuous or periodic calibration techniques applicable to inertial navigation systems, inertial guidance units and the like may be used.

As will be appreciated by those skilled in the art, the security system 10 configured for operation with the item of electronic merchandise 20 advantageously allows a potential purchaser 36 to direct his or her attention on the electronic merchandise 20 instead of being annoyed or distracted with a cumbersome tethered security system or device. The security system 10 similarly allows retailers to likewise focus attention on the display merchandise and not a tethered security system or device. As a result, the security system 10 provides for an improved or increased "customer experience," and thereby increases the likelihood of making a sale, while reducing merchandise losses due to theft. In particular, mechanical and electromechanical tethered security devices that include cords, cables, etc. may interfere with the customer experience by restricting the ability of the potential purchaser to freely interact with the item of electronic merchandise 20.

In tethered and/or wired security systems and devices, the cables or cords may be become worn over repeated use, and as a result, may cause false alarms. As will be appreciated by those skilled in the art, a false alarm may be embarrassing to a potential purchaser and may deter the customer from purchasing the item of merchandise 20. Accordingly, the cables and/or cords often need to be replaced, which leads to increased maintenance and additional security costs to the retailer. Still further, in the case of a retail display for displaying electronic merchandise such as described herein, an additional cable may be required to supply power to the merchandise, as the battery cells 34 may be capable of supplying power to the electronic item of merchandise 20 for only a limited amount of time, especially when the merchandise is operated repeatedly by potential purchasers while the store is open.

Figure 4:
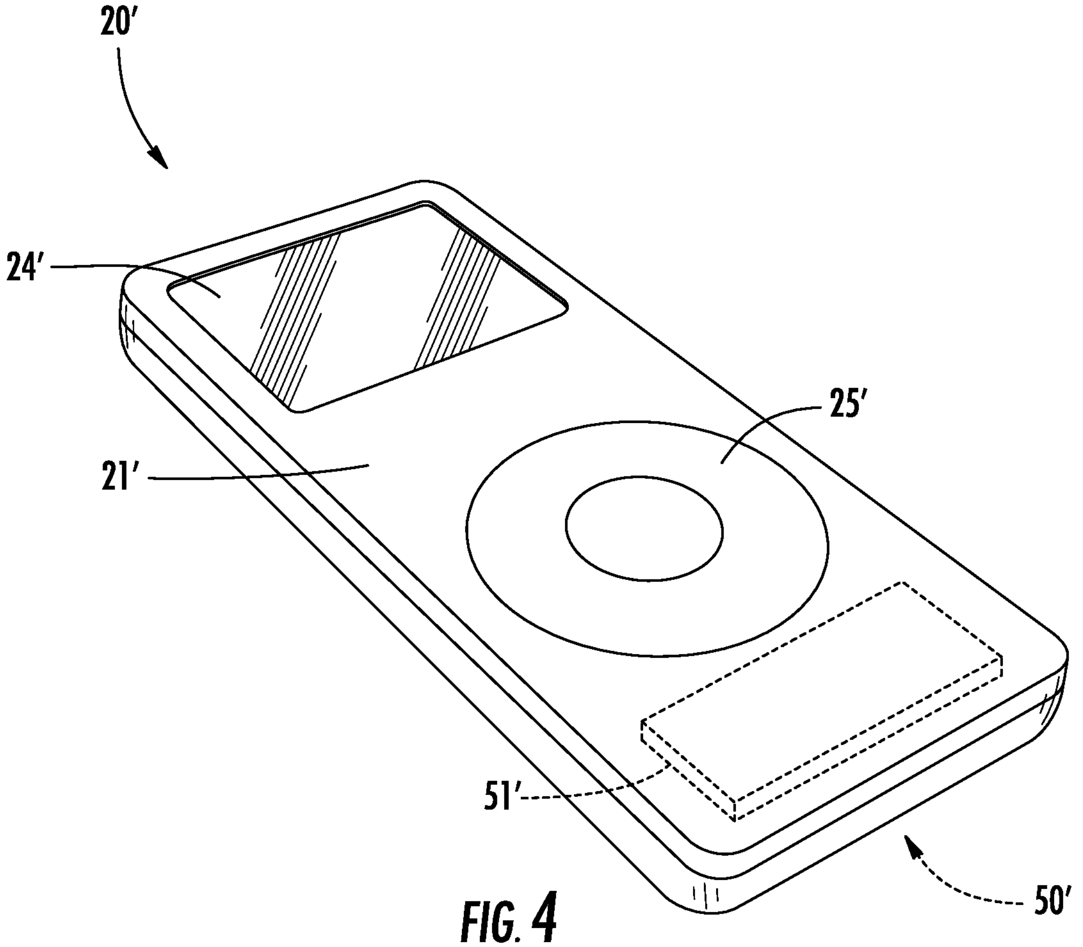
FIG. 4 is a perspective view of another exemplary embodiment of a security system in accordance with the present invention for protecting retail display merchandise from theft configured for operation with an item of electronic merchandise.
Figure 5:
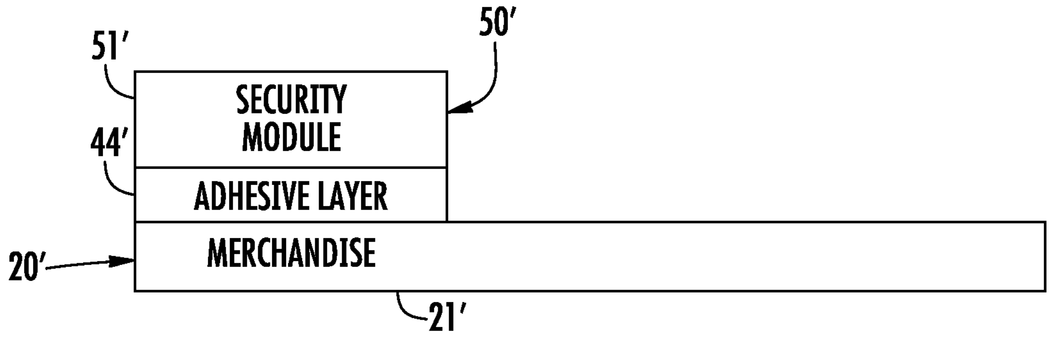
FIG. 5 is an elevation view of the security system and the item of electronic merchandise of FIG. 4.
Figure 6:
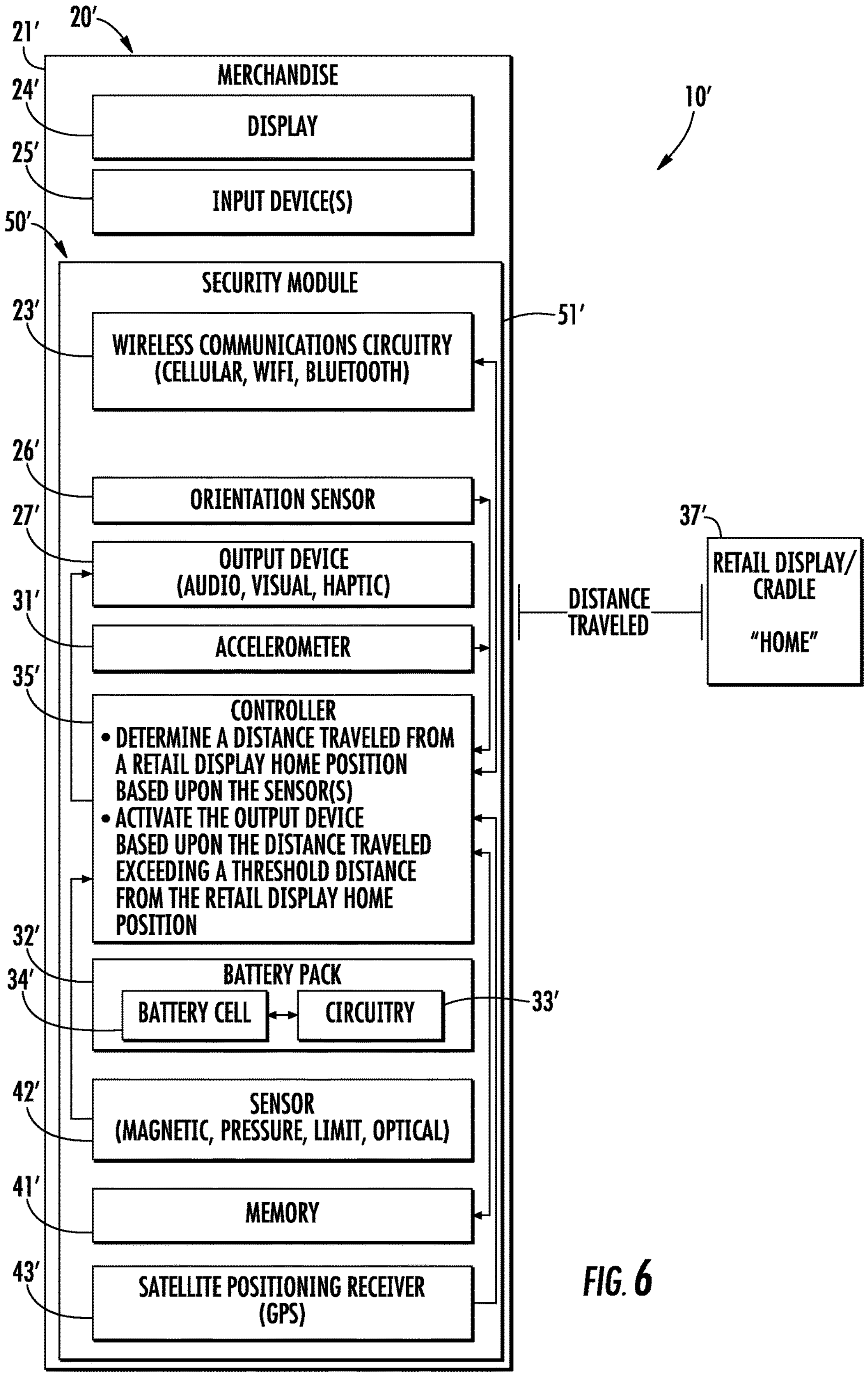
FIG. 6 is a flowchart illustrating another exemplary embodiment of a system and method in accordance with the present invention for operating the security system of FIG. 4 with the item of electronic merchandise.

Referring now to FIGS. 4-6, another exemplary embodiment of a security system 10' according to the present invention is configured for operation with an item of merchandise 20' that includes a housing 21' having a display 24' and input devices 25' carried by the housing. In addition, an externally mounted security module 50' is secured to the item of merchandise 20'. The security module 50' includes its own housing 51' that carries an orientation sensor 26' and accelerometer 31'. The security module 50' also includes an output device 27', and may optionally include wireless communications circuitry 23', for example, Bluetooth or other protocol communications circuitry. A power source 32', for example an internal battery pack, is also carried by the housing 51' to provide power to a controller 35' and related circuitry, as will be appreciated by those skilled in the art.

An adhesive layer 44' (FIG. 5) may be used to mount or attach the housing 51' of the security module 50' to the housing 21' of the item of merchandise 20'. For example, the adhesive layer 44' may be a pressure sensitive adhesive (PSA). Other types of adhesives may be used, and other mounting or attachment elements may be used, such as interlocking features, magnetically attractive strips, etc. as will be appreciated by those skilled in the art. The temporary (i.e. releasable) coupling permits the security module 50' to be installed for retail display and subsequently removed upon sale of the item of merchandise 20' or in order to reuse the security module 50' with a different item of merchandise.

The above-noted components are operably coupled to the controller 35' that is carried within the housing 51'. The controller 35' is advantageously configured to operate similarly to the embodiment of the security system 10 configured for operation with the item of electronic merchandise 20 described above with respect to FIGS. 1-3. In other words, the security module 50' with controller 35' is a stand-alone security system 10' that may be externally mounted or attached to a housing 21' of the item of merchandise 20', or to any other high value merchandise. It should be noted that since the security module 50' is a stand-alone security system, the item of merchandise 20' need not be an electronic item of merchandise. For example, the item of merchandise 20' may be an article of jewelry, an article of clothing, an item of pre-recorded media (e.g. CD, DVD, etc.) or the like. Alternatively or additionally, the item of merchandise 20' may include electronics, such as the cellular telephone illustratively shown herein with respect to the exemplary embodiments of the invention.

The security module 50' may also include a further sensor 42', for example, a mechanical limit or pressure sensor, that may be operably coupled to the controller 35'. The further sensor 42' may be configured to sense a separation between the housing 51' and the housing 21' that would occur if the security module 50' is removed (detached) from the item of merchandise 20'. Other sensors may cooperate with the controller 35' to sense tampering with the security module 50', for example, an electrical sensor, optical (i.e. light) sensor, or a magnetic sensor. Regardless, the controller 35' may be operable to activate an alarm based on an indicated state of the further sensor 42', as previously described.

The security module 50' is particularly advantageous for protecting an item of merchandise 20' that does not include wireless communications circuitry, an accelerometer, and/or a gyroscope, for example, a stand-alone camera or a stand-alone portable media player, electronic reader or the like. In other words, the security module 50' may be considered an "add-on" to the item of merchandise 20'. However, if the item of merchandise 20' includes wireless communications circuitry, the wireless communications circuitry 23' of the security module 50' may communicate with the wireless communications circuitry of the item of merchandise to control operation thereof, such as to shut off the item of merchandise or to restrict (disable) its operation. At least some of the above-noted components, for example, the output device 27' may be carried by the housing 21' of the item of merchandise 20' in further embodiments.

In an advantageous embodiment, the security module 50' is an external sensor that is temporarily attached, for example via a pressure sensate adhesive (PSA), to an item of merchandise 20' and is removably positioned or supported on a display stand, alarm module, base or the like 38 having battery charging capability. Preferably, both the sensor 50' and the base 38 have wireless "qi" compliant battery charging capability that incorporates magnetic inductive coils to transfer electrical power from the base to the sensor in a known manner. Furthermore, the base 38 and/or the sensor 50' include voltage regulator electronics and circuitry for providing a proper charging and/or operating voltage to an electronic item of merchandise 20' attached to the sensor. For example, the base 38 and/or the sensor 50' may include electronics and circuitry for identifying an electronic item of merchandise 20' and its charging and operating power requirements. Consequently, the base 38 is operable to provide electrical power to the sensor 50' and/or an electronic item of merchandise 20' attached to the sensor when the sensor is positioned or supported on the base.

Regardless, the sensor 50' operates in the manner previously described to determine a distance travelled by the item of merchandise 20' away from a retail display "home" position 37' (i.e. base 38) and to activate an output device 27' in the event that the distance travelled from the base 38 exceeds a threshold distance. In a particular embodiment, the wireless communications circuitry 23' of the sensor 50' communicates with wireless communications circuitry disposed within the base 38 to activate an additional output device, such as a visual indicator (e.g. LED) or an audio alarm, at the "home" location and/or a remote location. As such, the orientation sensor 26' and the accelerometer 31' previously described may be carried by the base 38 instead of the sensor 50'. Furthermore, the sensor 50' and/or the base 38 may be provided with a communications port for programming as well as for enabling and subsequently disabling the security system 10'. In still other embodiments, the base 38 may be configured via the wireless "qi" compliant battery charging capability to automatically determine the charging and/or operating power requirements for another electronic item of merchandise 20' attached to a different sensor 50' in the event that the different sensor is inadvertently positioned or supported on the base.

Figure 7:
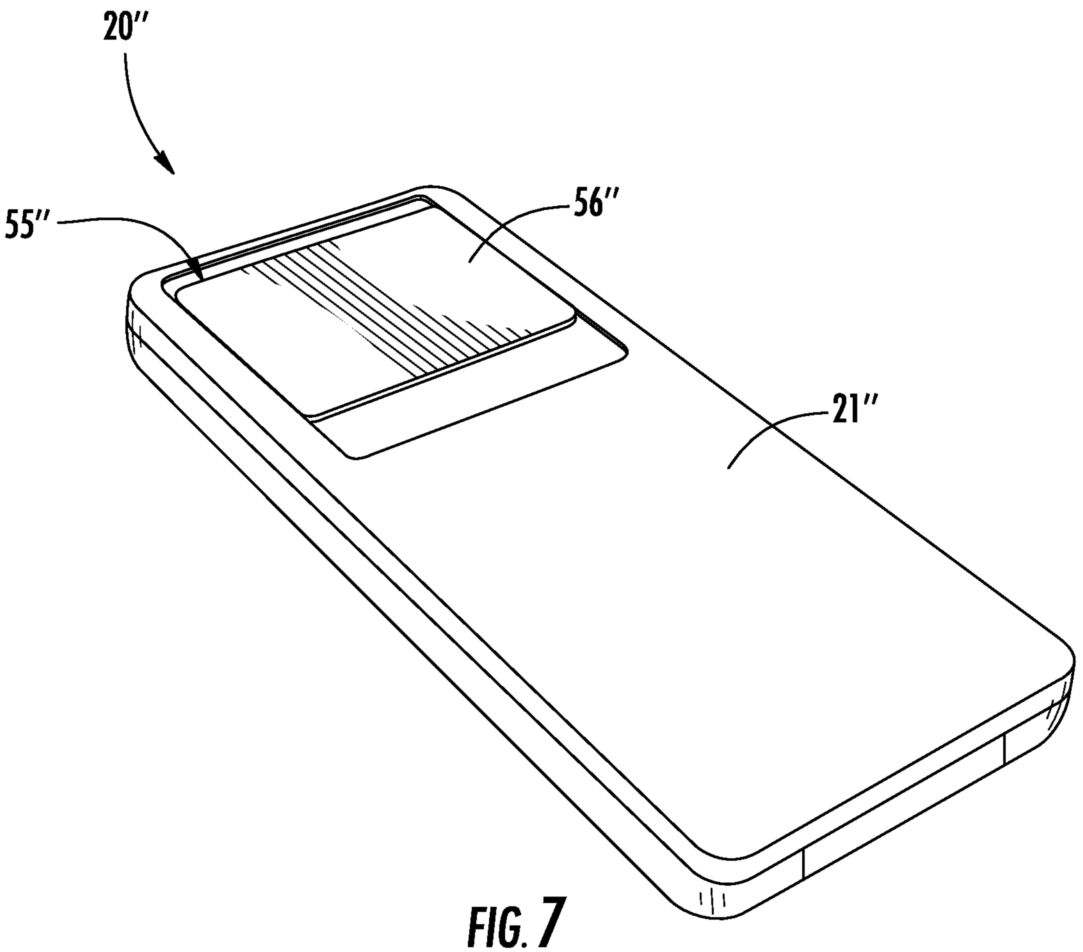
FIG. 7 is a perspective view of another exemplary embodiment of a security system in accordance with the present invention for protecting retail display merchandise from theft configured for operation with an item of electronic merchandise.
Figure 8:
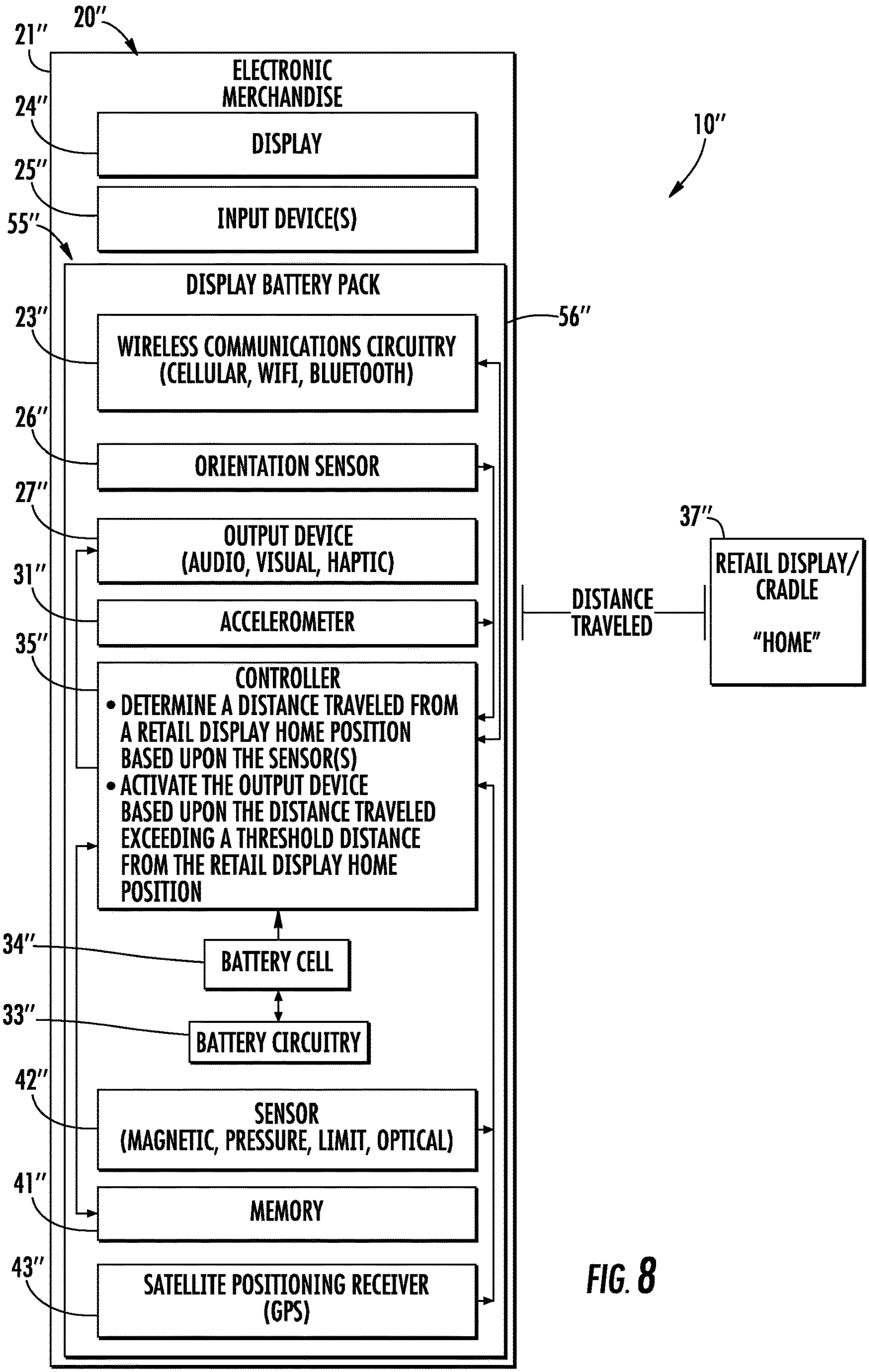
FIG. 8 is a flowchart illustrating another exemplary embodiment of a system and method in accordance with the present invention for operating the security system of FIG. 7 with the item of electronic merchandise.

Referring now to FIGS. 7-8, yet another exemplary embodiment of a security system 10" according to the present invention is configured for operation with an item of electronic merchandise 20". The security system 10" is embodied in the form of a display battery pack 55". The display battery pack 55" includes a housing 56" that is sized to be disposed within the housing 21" of the item of electronic merchandise 20" in place of the service battery pack. In other words, the display battery pack 55" has the same size and shape (planform) as the service battery pack normally provided for the item of electronic merchandise 20". As such, the display battery pack 55" may be inserted into the battery compartment of the item of electronic merchandise 20" to temporarily replace the standard service battery pack.

Similar to the embodiments of the security system described above with respect to FIGS. 1-3 and FIGS. 4-6, the display battery pack 55" also includes an orientation sensor 26" carried by the housing 56" and an accelerometer 31" also carried by the housing 56". The display battery pack 55" also includes an output device 27", and may also optionally include wireless communications circuitry 23", for example, Bluetooth or other protocol communications circuitry. A reduced power source 32" (e.g. battery cell 34") and related battery circuitry 33", is also carried by the housing 56" to power the controller 35" and other components of the display battery pack 55", as will be appreciated by those skilled in the art. However, the configuration of the battery cell 34" is physically more compact than a standard-sized battery cell typically provided with the service battery pack for the item of electronic merchandise 20", since the above-noted electronic components of the display battery pack 55" also require space within the housing 56".

The display battery pack 55" may be configured to be charged inductively or capacitively from a charging station (not shown), which may be the "home" position, as previously described. For example, the display battery pack 55" may include the standardized Wireless Power Consortium's "qi" compliant charging capabilities. Alternatively, the display battery pack 55" may be compliant with other charging standards or may be operable for charging via a proprietary charging protocol. Advantageously, the display battery pack 55" being "qi" compliant does not require the item of electronic merchandise 20" itself to be "qi" compliant, and further, requires no additional hardware on the item of electronic merchandise 20" for charging in the retail display environment (e.g. a power adapter cable). Of course, the display battery pack 55" may be charged using any other charging method without departing for the intended scope of the security systems and methods of the present invention. Regardless, the above mentioned components are operably coupled to the controller 35" that is carried within the housing 56". The controller 35" is advantageously configured to operate similarly to the embodiments described above with respect to FIGS. 1-3 and FIGS. 4-6.

The display battery pack 55" is also particularly advantageous for protecting an item of electronic merchandise 20" that does not include wireless communications circuitry, an accelerometer, and/or a gyroscope, for example a conventional camera, portable media player, electronic reader or the like. Advantageously, the display battery pack 55" does not increase the size or footprint of the item of electronic merchandise 20", and furthermore, does not protrude or extend outwardly from the housing 21" of the electronic merchandise.

Moreover, if the item of electronic merchandise 20" includes wireless communications circuitry, the wireless communications circuitry 23" of the display battery pack 55" may communicate with the wireless communications circuitry of the electronic merchandise to control operation thereof, for example, to shut-off the item of electronic merchandise or to restrict (i.e. disable) its operation. At least some of the above-noted components, for example, the output device 27" may be carried by the housing 21" of the item of electronic merchandise 20".

A further sensor 42", such as, for example, a mechanical limit or pressure sensor, or other sensor or sensors (e.g. electrical, magnetic, optical, etc.) may cooperate with the controller 35" to determine when the battery compartment door of the housing 21" is being opened. This may be indicative of tampering, or more particularly, an attempt to remove the display battery pack 55". Based upon the sensor detecting an unsecured state or condition, the controller 35" may activate an alarm and/or communicate, via the wireless communications circuitry 23", to control or disable the item of electronic merchandise 20". In addition, the display battery pack 55" may be more securely retained within the battery compartment of the housing 21" of the item of electronic merchandise 20" with an attachment element, such as an adhesive, anchors or functionally similar hardware, or a press fit. Securely retaining the display battery pack 55" may advantageously increase the amount of time required for a potential thief to remove the display battery pack from the item of electronic merchandise 20".

While the security system described above with respect to FIGS. 7-8 may be in the form of a display battery pack 55", it will be appreciated by those skilled in the art that the same functionality and components of the display battery pack may be embodied in any form factor. For example, the security system may be embodied in the form of a secure-digital (SD) memory card or subscriber identity module (SIM) card that is coupled with a camcorder, camera, electronic reader, personal computer, tablet or other item of electronic merchandise. Furthermore, the security system may take other forms where it is embodied in a replacement module or component for an existing module or component of an item of merchandise.

Figure 9:
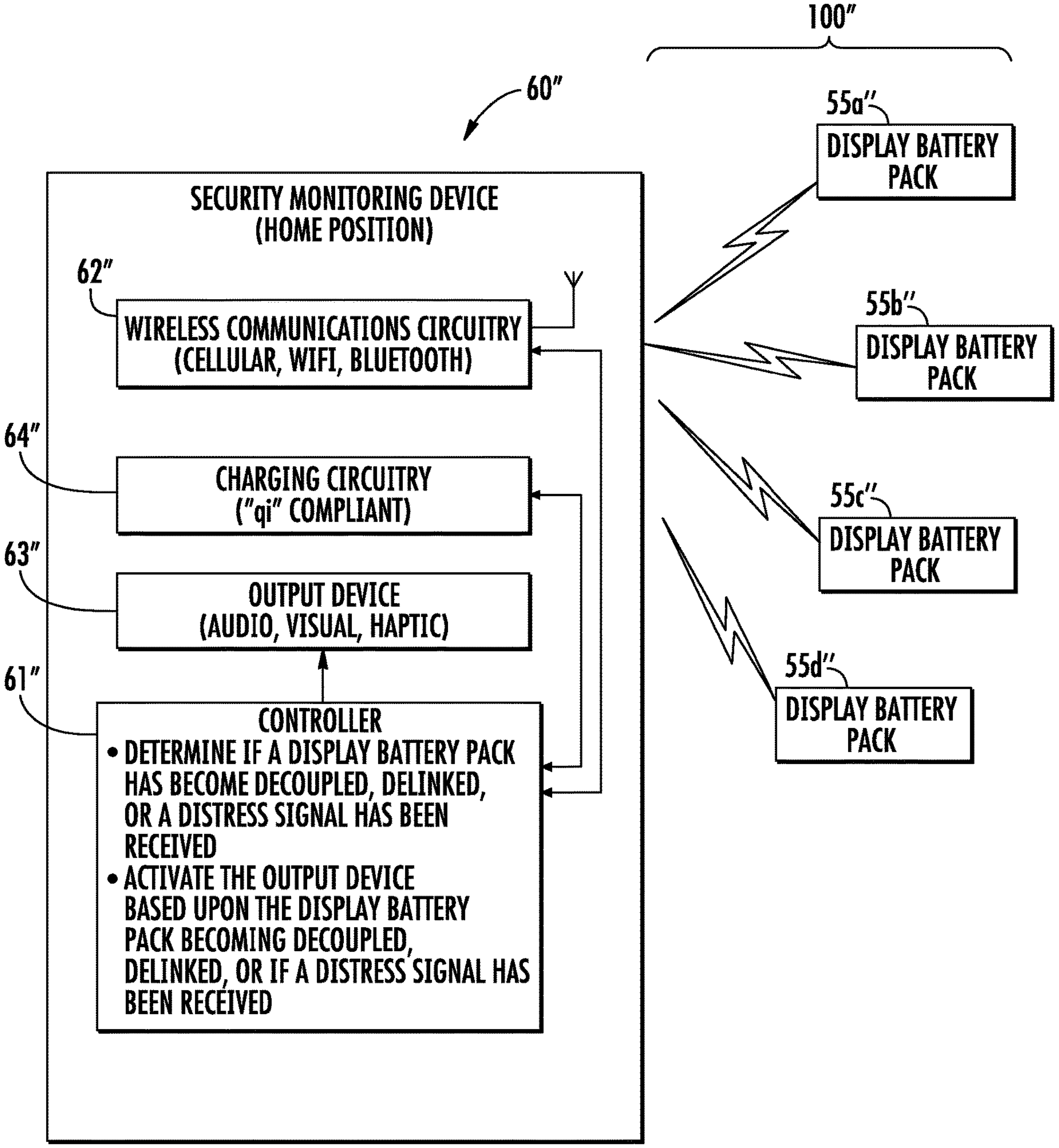
FIG. 9 is a flowchart illustrating another exemplary embodiment of a system and method in accordance with the present invention for operating one or more of the security systems of FIG. 7 with a security monitoring device.

FIG. 9 illustrates an exemplary embodiment of a system and method 100" according to the present invention for operating one or more of the display battery packs 55*a*"-55*d*" with a security monitoring device 60". As shown, the security monitoring device 60" includes a controller 61" and wireless communications circuitry 62" coupled to the controller 61" of the security monitoring device. Advantageously, the security monitoring device 60" is paired, for example, by wireless communication (e.g. Bluetooth, RF, etc.), with each of the display battery packs 55*a*"-55*d*". As such, each display battery pack 55*a*"-55*d*" communicates, via its respective wireless communications circuitry 23", with the security monitoring device 60" via its wireless communications circuitry 62". In other words, each display battery pack 55*a*"-55*d*" is paired with the security monitoring device 60" by way of wireless communications. The security monitoring device 60", via its controller 61", monitors communications to each of the display battery packs 55*a*"-55*d*", for example, for an indication that each security system 10" is active.

The security monitoring device 60" may be conceptually thought of as a "watch tower." If the security monitoring device 60" detects, for example, via a received "distress" signal from a display battery pack 55*a*"-55*d*", or determines that communication with a security system has been lost (i.e. decoupled or de-linked), the security monitoring device's controller 61" may activate an output device 63" indicative of an unsecured state or condition, for example, an audio, visual, and/or haptic alarm. The controller 61" may also communicate, via the wireless communications circuitry 62", to each display battery pack 55*a*"-55*d*" to activate a respective output device 27" of each display battery pack security system (i.e. a dual alarm condition) so that security personnel are able to identify the display battery pack 55" of a particular item of electronic merchandise 20" communicating a distress signal. The security monitoring device 60" may also be activated based upon any of the further sensors described above, or manually, as will be appreciated by those skilled in the art. Moreover, the security monitoring device 60" may also include charging circuitry 64" coupled to the controller 61" and configured to function as a charger for the display battery packs 55*a*"-55*d*", and may be "qi" compliant as described above.

While the display battery pack 55" has been described as being used with the security monitoring device 60", it will be appreciated that the security monitoring device 60" may be used in conjunction with any of the above exemplary embodiments of security systems according to the present invention. In particular, the security monitoring device 60" may be used in conjunction with a retail display cradle 37", as previously described, and may likewise define a "home" position for an item of electronic merchandise 20". In another exemplary embodiment, the security monitoring device 60" is paired to a security system according to the present invention by a wireless communication link (e.g. Bluetooth; RF; etc.) and acts as a "watch tower" with a "dead man's switch" to activate an alarm at the security monitoring device based upon a failure to receive a return signal from the security system. Alternatively or additionally, the security monitoring device 60" may activate an alarm at a remote location or transmit a security signal (e.g. send a text or email notification) to security personnel, as previously described.

Additionally, it will be appreciated by those skilled in the art that any of the above-described exemplary embodiments may be used either alone or in conjunction with one another to provide a "multi-layered" security system that provides increased overall security. For example, as a "first layer," the controller of an item of electronic merchandise may cooperate with the memory of the merchandise to provide increased security as described above with respect to FIGS. 1-3. The same item of electronic merchandise may also include, as a "second layer," a display battery pack, as described with respect to FIGS. 7-8. As a "third layer," the security monitoring device, (i.e. watch tower), may also be used with wireless communications circuitry in the manner described with respect to FIG. 9.

A related method according to the present invention is provided for protecting a retail display item of electronic merchandise to be evaluated and operated by a customer when considering whether to purchase the merchandise. As described above, the item of electronic merchandise includes a portable housing, at least one sensor carried by the portable housing, at least one output device carried by the portable housing, and a controller carried by the portable housing and coupled to the at least one sensor and to the at least one output device. The method may include determining a distance, for example an absolute radial distance, traveled by the item of electronic merchandise from a retail display "home" position using the controller and the at least one sensor. The method may further include using the controller to activate the at least one output device based upon the distance traveled by the item of electronic merchandise from the "home" position exceeding at least one threshold distance.

As will be appreciated by those skilled in the art, the exemplary embodiments shown and described herein advantageously incorporate the functions and features of an inertial navigation system (INS) including appropriate sensors and a controller for motion processing based upon inputs from the sensors without external references. As used herein, the term "motion processing" refers to analysis of motion behavior based upon sensor inputs to determine a potentially unsecured state or condition. Although the primary parameter for determining an unsecured state or condition is the absolute radial distance that the item of merchandise has been moved from a "home" position, other parameters, such as direction of travel, rate of travel, acceleration, orientation, etc., may also determine an unsecured state or condition. In some embodiments, the security system including an inertial navigation system (INS) is a self-contained "add-on" security module that is affixed to an item of merchandise, for example, a retail display item of merchandise being displayed for sale in a display area of a retail store.

In other embodiments, the security system including the functionality of an inertial navigation system (INS) is advantageously incorporated into the form factor, i.e., size, shape, and volume, for example, of a display battery pack for an item of electronic merchandise. While the display battery pack necessarily reduces the stored energy capacity of the retail display merchandise, it provides the required components (including, for example, application software, sensors, and audio/speaker) for increased security and does not rely on the intrinsic components and capabilities of the item of electronic merchandise being displayed.

In yet further embodiments, an item of electronic merchandise may include a software application for "smart" electronic merchandise including inertial navigation system (INS) functionality that is capable of executing a third-party software application. In this manner, the security system leverages the sensors, controller, audio components and capabilities of the item of electronic merchandise, in particular, the host "smart" consumer electronics device. As will be appreciated by those skilled in the art, the term "smart" consumer electronics device as used herein refers to any device that is capable of executing a software application, for example, a cellular telephone, e-Reader, I-Pad, I-Pod, Tablet computer, tablet device, laptop computer, notebook computer, digital camera, SLR, media (audio/video) player, or other electronics device including processing capability and an executable memory.

As used herein, the term "inertial navigation system (INS)" means a navigation aid that uses a computer, motion sensors (e.g. accelerometers) and rotation sensors (e.g. gyroscopes) for processing motion without external references. The inertial navigation system (INS) advantageously determines, for example via dead reckoning, the position, orientation, and velocity (direction and speed of movement) of a moving object without reliance on external references. Indeed, one particularly advantageous embodiment of the present invention is a security system including an inertial navigation system (INS) in the form of a software application and associated hardware, or a security system configured for operation with such an item of merchandise, that does not rely on an external reference for determining the position of the item of merchandise relative to a predetermined "home" position.

It should be noted that the operations in instructions executed by the controller for any of the exemplary embodiments disclosed herein may be provided by a computer-readable medium, memory, or other storage medium. Many modifications and other embodiments of the invention will be readily apparent to one skilled in the art having the benefit of the teachings presented in the foregoing descriptions and the associated drawings. Therefore, it is understood and appreciated that the invention is not to be limited to the specific exemplary embodiments disclosed herein, and that modifications to the disclosed embodiments and other undisclosed embodiments are intended to be included within the scope of the appended claims.

That which is claimed is:

1. A security system comprising:

a mobile cellular device on display in a display area of a retail store, the mobile cellular device comprising:
- a housing;
- a memory storing computer-executable instructions;
- a controller;
- wireless communications circuitry; and
- an output device,
- each of the memory, the controller, the wireless communications circuitry, and the output device carried within the housing; and a wireless device external to the mobile cellular device and configured to wirelessly communicate with the wireless communications circuitry of the mobile cellular device, and wherein the computer-executable instructions are configured to cause the controller to perform one or more security functions based on the mobile cellular device exceeding a predetermined threshold defined relative to the wireless device for longer than a predetermined time period; and wherein the computer-executable instructions are configured to cause the controller to perform the one or more security functions upon a communication failure between the mobile cellular device and the wireless device.

2. The security system of claim 1, wherein the output device comprises an audio output device and a visual output device.

3. The security system of claim 1, wherein the mobile cellular device is a cellular telephone.

4. The security system of claim 1, wherein the memory is configured to be programmed with the predetermined threshold.

5. The security system of claim 1, wherein the memory is configured to be programmed with a plurality of predetermined thresholds.

6. The security system of claim 1, wherein the one or more security functions comprises activating the output device.

7. The security system of claim 6, wherein the computer-executable instructions are configured to cause the controller to deactivate the output device based upon the mobile cellular device subsequently being brought within the predetermined threshold.

8. The security system of claim 1, wherein the one or more security functions comprises transmitting a signal using the wireless communications circuitry.

9. The security system of claim 1, wherein the one or more security functions comprises providing a geographical position of the mobile cellular device to a remote server or central monitoring station.

10. The security system of claim 1, wherein the one or more security functions comprises communicating with a remote server or central monitoring station.

11. The security system of claim 1, wherein the one or more security functions comprises communicating a notification to security personnel.

12. The security system of claim 1, wherein the one or more security functions comprises disabling one or more operations of the mobile cellular device.

13. The security system of claim 1, wherein the one or more security functions comprises disabling one or more functions of the mobile cellular device.

14. The security system of claim 1, wherein the predetermined threshold is a zone defined relative to the wireless device.

15. The security system of claim 1, wherein the predetermined threshold is a distance defined relative to the wireless device.

16. A method for protecting a mobile cellular device on display in a retail store, the mobile cellular device comprising a controller, wireless communications circuitry, and an output device each carried within a housing, the method comprising:

wirelessly communicating between the mobile cellular device and a wireless device external to the mobile cellular device; and performing one or more security functions based on the mobile cellular device exceeding a predetermined threshold defined relative to the wireless device for longer than a predetermined time period; and wherein performing the one or more security functions comprises performing the one or more security functions upon on a communication failure between the mobile cellular device and the wireless device.

17. The method of claim 16, further comprising programming the predetermined threshold in the mobile cellular device.

18. The method of claim 16, wherein performing the one or more security functions comprises activating the output device.

19. The method of claim 16, wherein performing the one or more security functions comprises transmitting a signal using the wireless communications circuitry.

20. The method of claim 16, wherein performing the one or more security functions comprises disabling one or more operations or functions of the mobile cellular device.

21. The method of claim 16, wherein the predetermined threshold is a zone defined relative to the wireless device.

22. The method of claim 16, wherein the predetermined threshold is a distance defined relative to the wireless device.

* * * * *